(12) United States Patent
Sames

(10) Patent No.: US 9,560,857 B2
(45) Date of Patent: Feb. 7, 2017

(54) CLIPPING MACHINE WITH REPLACEABLE REPLACEMENT ASSEMBLY GROUP

(71) Applicant: Poly-clip System GmbH & Co. KG, Hattersheim (DE)

(72) Inventor: Jörg Sames, Alten Buseck (DE)

(73) Assignee: Poly-clip System GmbH & Co. KG, Hattersheim (DE)

( * ) Notice: Subject to any disclaimer, the term of this patent is extended or adjusted under 35 U.S.C. 154(b) by 520 days.

(21) Appl. No.: 13/958,529

(22) Filed: Aug. 2, 2013

(65) Prior Publication Data

US 2014/0038505 A1 Feb. 6, 2014

(30) Foreign Application Priority Data

Aug. 3, 2012 (EP) ..................................... 12179293

(51) Int. Cl.
*A22C 11/00* (2006.01)
*A22C 11/12* (2006.01)
*A22C 11/10* (2006.01)
*B65B 51/04* (2006.01)

(52) U.S. Cl.
CPC ............ *A22C 11/125* (2013.01); *A22C 11/105* (2013.01); *B65B 51/04* (2013.01)

(58) Field of Classification Search
CPC .......... A22C 11/00; A22C 11/02; A22C 11/10
USPC ........... 452/21–26, 30–32, 35–37, 46–48, 51
See application file for complete search history.

(56) References Cited

U.S. PATENT DOCUMENTS

| 4,847,951 | A  | * | 7/1989  | Kollross  | A22C 11/105 452/30 |
| 8,376,002 | B2 | * | 2/2013  | Jens      | A22C 11/0263 141/114 |
| 8,740,676 | B2 | * | 6/2014  | Ebert     | A22C 11/02 452/35 |
| 8,956,204 | B2 | * | 2/2015  | Niedecker | A22C 11/0263 452/32 |
| 2005/0274088 | A1 | | 12/2005 | Griggs et al. | |

FOREIGN PATENT DOCUMENTS

EP 0247545 A1 12/1987

* cited by examiner

*Primary Examiner* — Richard Price, Jr.
(74) *Attorney, Agent, or Firm* — Fitch, Even, Tabin & Flannery LLP

(57) ABSTRACT

The present invention relates to a clipping machine for producing sausage-shaped products by filling a flowable filling material into a tubular or bag-shaped packaging casing and closing said packaging casing by at least one closure means, the clipping machine comprises a filling tube, having a central axis and a filling outlet, for feeding said filling material in a feeding direction via said filling outlet into said packaging casing, a displacement device for gathering the filled packaging casing and for forming a plait-like portion thereto, at least substantially free from filling material and a clipping device for applying at least one closure means to said plait-like portion. The displacement device of the inventive clipping machine is arranged in a replacement assembly group, wherein the group is removably arrangeable at the clipping machine in an engagement position, in which the replacement assembly group is coupled to the clipping machine for production process.

15 Claims, 6 Drawing Sheets

CLIPPING MACHINE WITH REPLACEABLE REPLACEMENT ASSEMBLY GROUP

This application claims priority to, and the benefit of, European Patent Application No. 12 179 293.1-1260 filed Aug. 3, 2012 with the European Patent Office, which is hereby incorporated by reference.

BACKGROUND OF THE INVENTION

The present invention relates to a clipping machine for producing sausage-shaped products according to the preamble of independent claim 1 as well as a replacement assembly group comprising a displacer device for gathering a filled packaging casing for production of sausage-shaped products according to the preamble of independent claim 15.

In particular, the present invention relates to a clipping machine for producing sausage-shaped products, like sausages, by filling a flowable filling material into a tubular or bag-shaped packaging casing and closing said packaging casing by at least one closure means, like a closure clip. The clipping machine comprises a filling tube, having a central axis and a filling outlet, for feeding said filling material in a feeding direction via said filling outlet into said packaging casing. The filling machine further comprises a displacement device for gathering the filled packaging casing and for forming a plait-like portion thereto, at least substantially free from filling material. Furthermore, the clipping machine comprises a clipping device for applying at least one closure means to the plait-like portion.

Moreover, the present invention relates to a replacement assembly group comprising a displacement device for gathering a filled packaging casing for production of sausage-shaped products and for forming a plait-like portion thereto and a coupling device.

In the practice, it is known that, e.g. in the production of sausage-shaped products like sausages, a filling material is fed by a filling machine through a filling tube of a clipping machine into a tubular casing material, which is stored on the filling tube and which is closed at its front end, referred to the feeding direction, by a closing clip. The tubular casing material is pulled off from the filling tube while being filled. After a predetermined volume of filling material is filled into said tubular casing material, a displacement device with at least a first and a second pair of displacement elements forms a plait-like portion of the tubular casing material, and the clipping machine places and closes at least one closing clip at the plait-like portion forming the back end of the sausage-shaped product just produced and the front end of the next sausage-shaped product to be produced by respective closing tools which are reversibly movable towards the plait-like portion. After that the sausage-shaped product just produced, is separated from the remaining casing material by a knife or the like of a cutting device of the clipping machine and is transferred to a storage device or another machine for the next producing step.

Moreover, it is known to produce sausage-shaped products, in particular sausages, having different kinds of cross-sections, e.g. circular or non-circular cross-section, like a rectangular cross-section or a cross-section with at least two flattened side surfaces. Beyond that the sausage-shaped products to be produced may also vary in the dimension of its cross-section, e.g. diameter, height or width.

For shifting production for sausage-shaped products to sausage-shaped products with different cross-section and/or dimension, the clipping machine has to be reconfigured by replacing at least the displacement elements of the displacement device. For this operation, the clipping machine has to be stopped, fixation means of each displacement element detached, the actual displacement elements removed, the replacement displacement elements installed and secured by the fixation means. Furthermore, in many cases the clipping device has to be adjusted or replaced as well.

Accordingly, the replacement procedure of the displacement elements bears two major problems. Firstly, the procedure requires the operator to use both hands, e.g. for simultaneously holding and securing the respective displacement element. Secondly, the accessibility of the displacement elements is often limited, due to the position of the displacement elements and/or other machine parts, e.g. protective sheets, hence, constraining and slowing down the replacement procedure. Beyond that, the amount of work steps of the replacement procedure makes the whole procedure extremely time-consuming. As a matter of fact, the clipping machine must remain shut down and cannot produce during the replacement procedure. However, idleness of production machines reduces the overall productivity and increases the production costs consequently.

Hence, it is an object of the present invention to provide a clipping machine and a replacement assembly group, with which the above mentioned drawbacks can be overcome, in particular with which at least the displacement elements can be replaced one-handed and with significantly reduced setup time.

SUMMARY OF THE INVENTION

The aforesaid object with regard to the clipping machine for producing sausage-shaped products, like sausages, is achieved by the features of independent claim 1. Advantageous configurations of the clipping machine are described in claims 2 to 14. The aforesaid object with regard to the displacement assembly group is achieved by the features of independent claim 15.

According to the present invention, there is provided a clipping machine for producing sausage-shaped products, like sausages, by filling a flowable filling material into a tubular or bag-shaped packaging casing and closing said packaging casing by at least one closure means, like a closure clip. The clipping machine comprises a filling tube, having a central axis and a filling outlet, for feeding said filling material in a feeding direction via said filling outlet into said packaging casing, a displacement device for gathering the filled packaging casing and for forming a plait-like portion thereto, at least substantially free from filling material, and a clipping device for applying at least one closure means to said plait-like portion.

The displacement device is arranged in a replacement assembly group, which is removably arrangeable at the clipping machine in at least one engagement position, in which the replacement assembly group is coupled to the clipping machine for production process. By grouping the displacement elements of the displacement device to an exchangeable replacement assembly group, a replaceable functional module is provided. Thus, for replacing the displacement elements from the clipping machine the whole replacement assembly group can be exchanged with another replacement assembly group. Hence, the replacement operation can be performed with less work steps, wherein the single work steps can be performed one-handed.

As already pointed out, the displacement device often needs to be exchanged when production is shifted to products of different size or shape. Since this does not necessarily require a change of the clipping device or the cutting device, both devices may be directly mounted to the clipping machine and do not need to be part of the replacement assembly group. This configuration has the advantage that the replacement assembly group bears less components, needs less connections for routing operation fluids and is lighter than a configuration comprising the clipping device.

On the other hand, in some applications it might be reasonable and is within the scope of the present invention to integrate the clipping device into the replacement assembly group as well. This is especially useful when a shift of production regularly requires a replacement of the displacement device and the clipping device. Combining the clipping device with the replacement assembly group has the positive effect that by exchanging the replacement assembly group, the displacement device and clipping device are replaced simultaneously and the expenditure of time for the replacement procedure is reduced.

Furthermore, in some cases it can be advantageous and is within the scope of the present invention that the cutting device is mounted to the replacement assembly group as well, especially for maintenance reasons. In case of a broken or blunt cutting device, the whole replacement assembly group can be exchanged quickly and the cutting device can be fixed at the removed replacement assembly group. Hence, production downtime can be minimized.

In an advantageous configuration, the replacement assembly group comprises a coupling device with at least one first linear guide rail with an outer surface and a guiding axis. The coupling device is connectable to the clipping machine in a way that the first linear guide rail is at least partly inserted into a respective main bore of the clipping machine, wherein the replacement assembly group is linearly movable relatively to the clipping machine along the guiding axis. For mounting a replacement assembly group to the clipping machine, the first linear guide rail of the coupling device is inserted into the respective main bore of the clipping machine and the replacement assembly group moved relatively to the clipping machine along the guiding axis until the replacement assembly group is in engagement position with the clipping machine. The coupling device may comprise an abutment face for being contactable with a respective abutment face of the clipping machine in the engagement position and thus preventing the coupling device from being further inserted into the main bore.

Preferably, the coupling device comprises at least one second linear guide rail, which is arranged parallel to the first linear guide rail, for guiding the replacement assembly group linearly along the guiding axis. By this means, a momentum around the guiding axis can be retained, thus suppressing any rotational component of the displacement assembly group relatively to the clipping machine. In a preferred embodiment of the invention, the coupling device comprises two second linear guide rails. The two second linear guide rails may be configured to accommodate most of the forces between the replacement assembly group and the clipping machine.

According to a further aspect of the present invention, the guiding axis is arranged crosswise to the feeding direction of the filling material. In a preferred embodiment, the angle between the guiding axis and the feeding direction is 90 degrees. This configuration alleviates especially the mounting procedure of the replacement assembly group to the clipping machine, since the likeliness of a possible collision of the replacement assembly group with other components of the clipping machine, such as the filling tube or a discharge device, can be reduced.

In a preferred embodiment of the invention, the first linear guide rail has a circular cross section. In a further preferred embodiment, the second linear guide rail has a circular cross section. Preferably, the first linear guide rail and the second linear guide rail have a tapered region at a front end side, facing away from the replacement assembly group. By these means, the mounting procedure of the replacement assembly group to the clipping machine can be further facilitated.

In order to operate the displacement elements for forming the plait-like portion to the filled packaging casing, the displacement device has to be provided with an operation fluid. Therefore, it is preferred that the first linear guide rail comprises at least one duct through which the operation fluid is routable. The duct comprises at least a first duct segment, defining an aperture of the duct at a longitudinal side and extending towards the guiding axis of the first linear guide rail, preferably in a direction perpendicular to the guiding axis. Further, the duct can comprise a second duct segment, extending longitudinally inside along the first linear guide rail, preferably parallel to the guiding axis, and a third duct segment, defining another aperture at a longitudinal or face side of the first linear guide rail. Preferably, the third duct segment defines an aperture at a longitudinal side near a face side of the first linear guide rail and extends from the outer surface of the first linear guide rail towards the inside of the first linear guide rail, preferably in a direction perpendicular to the guiding axis.

The first duct segment, the second duct segment and the third duct segment are interconnected for routing through the operation fluid for operating the displacement elements and/or clipping device. In a preferred embodiment of the present invention, the aperture of the third duct is located within a connector, wherein the connector can be connected to a respective connector of a displacement device, e.g. by means of a hose or pipe.

Preferably, the first duct segment extends circumferentially around the guiding axis, thus defining an opening of the duct which is accessible from all sides around the guiding axis. This configuration improves the connectivity of the first duct segment with a respective duct connector of the clipping machine.

In an advantageous embodiment of the invention, the clipping machine comprises at least one duct connector, wherein the duct connector is configured to provide an operation fluid to a respective duct and/or to receive an operation fluid from a respective duct. The duct connector is arranged to be connected to a respective duct, when the replacement assembly group is coupled to the clipping machine in the engagement position. Thus, providing a pipeline for routing the operation fluid between the clipping machine and the displacement device. This supersedes the necessity for manually connecting the displacement device to respective connectors of the clipping machine.

For clogging the connection between the duct and the respective duct connector from the environment, it is preferred that the duct connector comprises at least one gasket.

Preferably, at least one gasket is circumferentially arranged inside the bore of the clipping machine to engage the outer surface of the first linear guide rail, when the replacement assembly group is in the engagement position. Alternatively or additionally, a gasket can be circumferentially arranged at the outside of the first linear guide rail.

Advantageously, the first linear guide rail comprises a plurality of ducts through which an operation fluid is routable. For gathering the filled packaging casing and for forming a plait-like portion thereto, displacement devices usually need up to four connectors for operation fluid for each displacement element. The clipping device and the cutting device usually require one or two connectors each. Preferably, each connection between a duct and a respective duct connector comprises at least one gasket.

In a further advantageous configuration, some ducts of the first linear guide rail have different dimensions. This feature contributes to the fact that operation fluids can be required in different volume flow and at different pressures.

Preferably, the replacement assembly group is releasably retainable at the clipping machine by means of a quick connecting device, which can be formed by a screw. When the displacement assembly group is connected to the clipping machine in the engagement position, the screw can fix the first linear guide rail to the clipping machine, e.g. to a wall of the end of the main bore.

In a preferred embodiment of the invention, the replacement assembly group is mounted to a mounting module, which is relatively moveable to the machine base and machine block in a direction parallel to the feeding direction. This is especially useful, in case the replacement assembly group comprises a casing brake for supporting the stretching of the tubular or bag-shaped packaging casing when being pulled off the filling tube to avoid wrinkles on the casing. For this purpose, the casing brake must be placed on the filling tube. For removing the replacement assembly group, the mounting module must be moved in a direction parallel to the feeding direction first, until the casing brake is shifted off the filling tube. In a next step, the replacement assembly group can be removed from the mounting module.

Moreover, according to the present invention, there is provided a replacement assembly group, comprising a displacement device with displacement elements for gathering a filled packaging casing for production of sausage-shaped products and for forming a plait-like portion thereto. The replacement assembly group comprises a coupling device via which it is connectible to a clipping machine according to the invention.

In the following, further advantages and embodiments of the inventive clipping machine as well as the replacement assembly group are described in conjunction with the attached drawings. Thereby, the expression "left", "right", "below" and "above" are referred to the drawings in an orientation of the drawings which allows a normal reading of the reference numbers.

DETAILED DESCRIPTION

Figure 1:
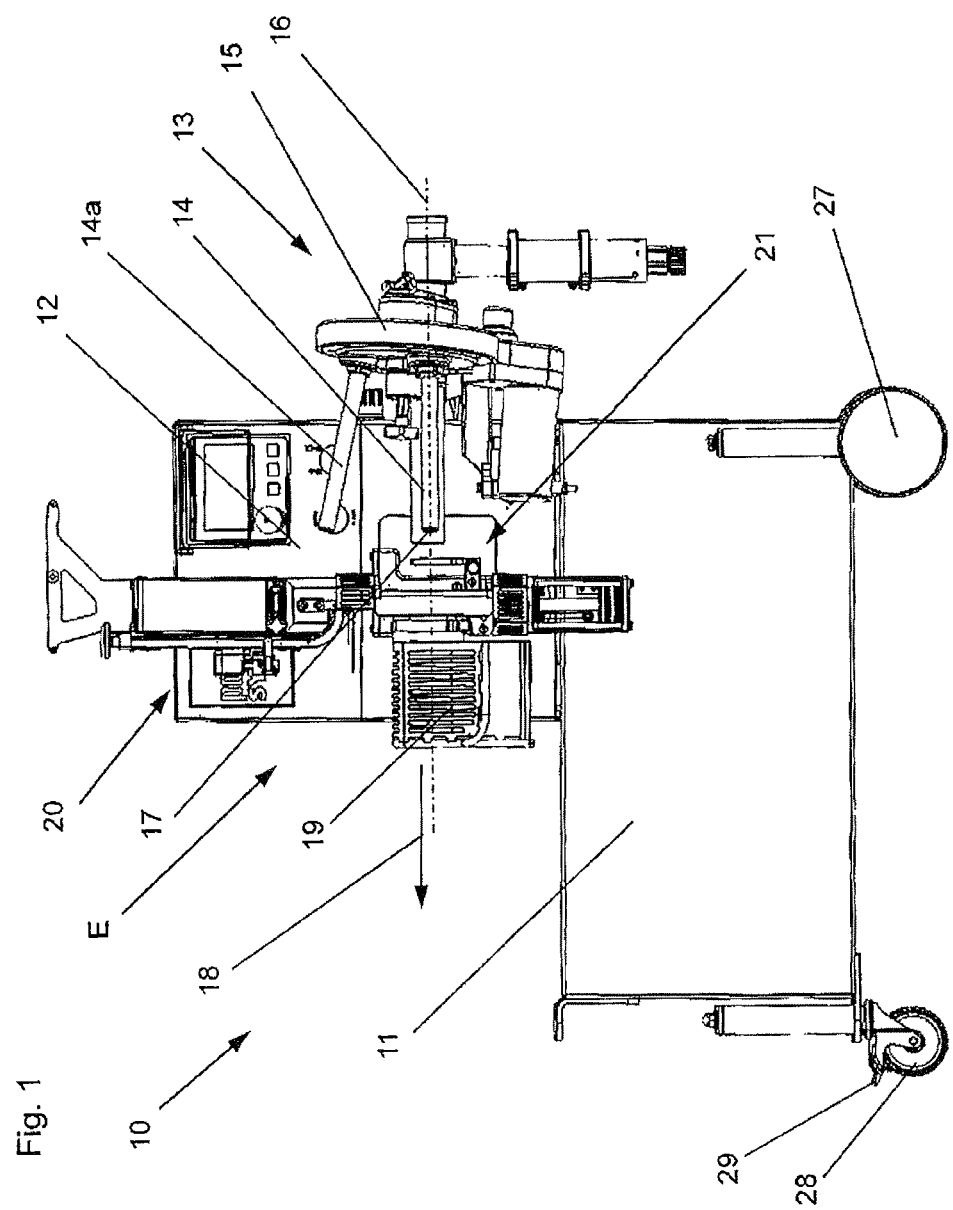
FIG. 1: is a side view of a clipping machine for producing sausage-shaped products according to the present invention.

A clipping machine 10 according to the invention, illustrated in FIG. 1, comprises a machine base 11 and a machine block 12 mounted on machine base 11. In this particular example, machine base 11 is provided with as set of non-swivel wheels 27 and a set of swivel wheels 28 with a foot brake for being flexibly movable and securely placeable at a production side.

In an alternative, not shown configuration of the present invention machine base 11 may comprise sockets instead of non-swivel wheels 27 and/or swivel wheels 28. With regard to a feeding direction 18, machine block 12 is mounted eccentrically on machine base 11, wherein, in alternative embodiments of the invention, machine block 12 can be mounted centered or slidably moveable parallel to feeding direction 18 on machine base 11. Machine block 12 is provided with a filling device 13, a replacement assembly group 20 and a discharge tray 19 arranged in this order along feeding direction 18.

Filling device 13 includes a filling tube revolver 15 with a first filling tube 14 and a second filling tube 14a assembled thereto. First filling tube 14 comprises a central axis 16 and a filling outlet 17. In the illustrated example, filling tube revolver 15 is adjusted for aligning central axis 16 of first filling tube 14 with feeding direction 18 for producing sausage-shaped products. First filling tube 14 and second filling tube 14a may differ in shape and/or size, e.g. diameter. During production, a not illustrated, packing casing or tubular casing material is provided on first filling tube 14 and the flowable filling material is provided through filling outlet 17 of first filling tube 14. Alternative embodiments of filling device 13 may comprise just one first filling tube 14 or more than two filling tubes 14, 14a, whereas size and/or shape of the filling tubes may be equal or different from each other. In a preferred embodiment, filling device 13 comprises three filling tubes 14, 14a. For changing production to second filling tube 14a, filling tube revolver 15 is rotatable to bring second filling tube 14a in line with feeding direction 18.

The machine block 12 further comprises a replacement assembly group 20 mounted thereto. The replacement assembly group 20 includes a displacement device 21, a not observable clipping device 25 and a cutting device. Alternatively clipping device 25 and/or cutting device can be mounted directly onto machine block 12.

Displacement device 21 is configured to gather the tubular casing material filled with filling material and to form a plait-like portion of the tubular casing material. Clipping device 25 is arranged to place and close at least one closing clip at the plait-like portion, thus forming an end of the sausage-shaped product just produced. The cutting device is provided for separating the line of sausage-shaped products just produced into single or groups of sausage-shaped products.

Preferably, replacement assembly group 20 is movably arranged parallel to feeding direction 18 and relative to machine block 12. At a side of the replacement assembly group 20 opposite to the side facing first filling tube 14, a discharge tray 19 is arranged at machine block 12. Discharge tray 19 is configured for gathering the closed sausage-shaped products and guiding them into a not illustrated container.

Figure 2:
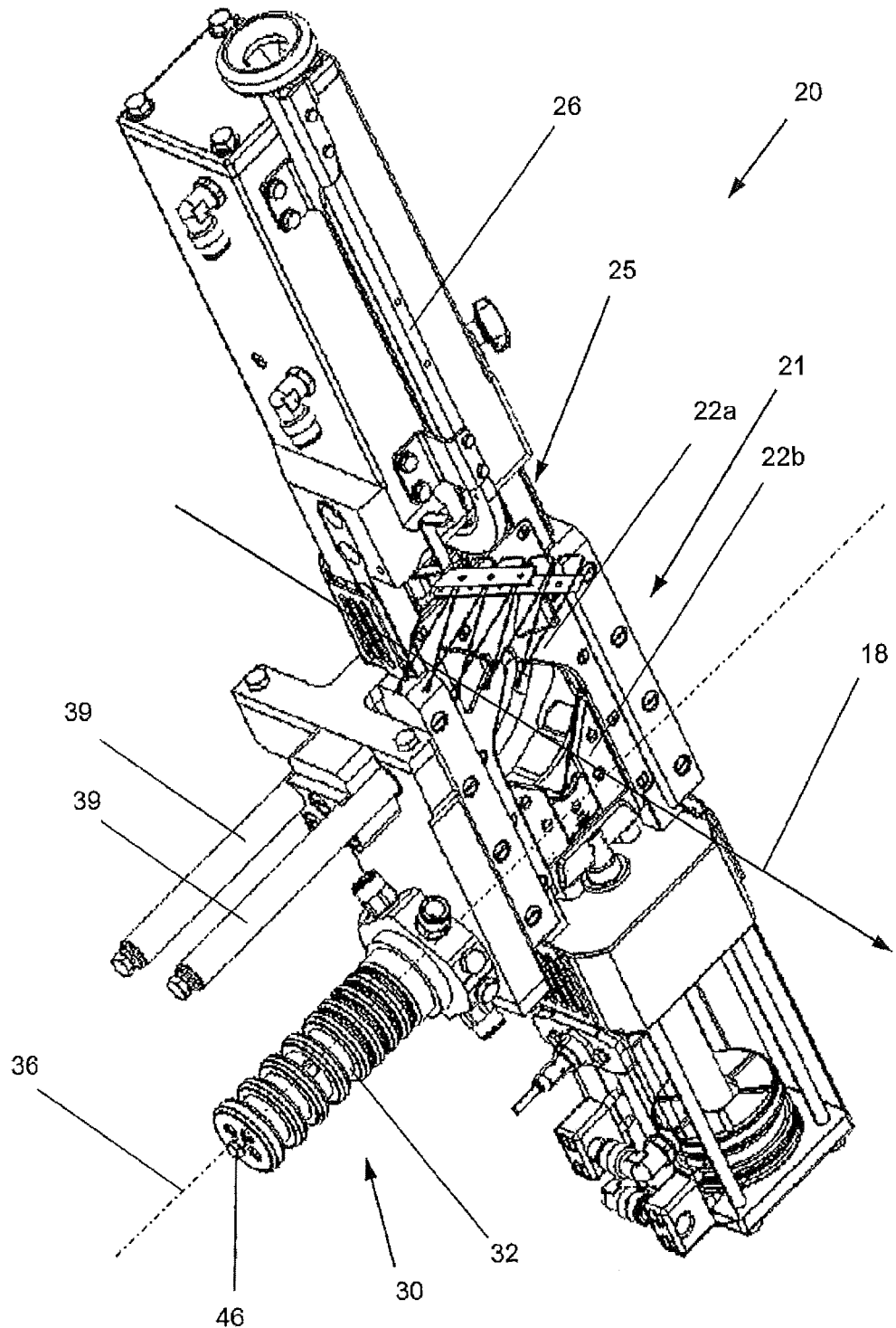
FIG. 2: is a perspective view of an embodiment of the replacement assembly group according to the present invention.

Replacement assembly group 20, as shown in FIG. 2, is not mounted to machine block 12 of clipping machine 10. For coupling replacement assembly group 20 to clipping machine 10, replacement assembly group 20 comprises a coupling device 30 including a first linear guide rail 32 with a circular cross-section and two second linear guide rails 39 with circular cross-sections as well. In alternative configuration, coupling 30 may comprise only one or more than two second linear guide rails 39. Further, for coupling replacement assembly group 20 to clipping machine 10, clipping machine 10 comprises a main bore 50 with circular cross-section for receiving first linear guide rail 32. For each second linear guide rail 39 clipping machine 10 further comprises a guide bore 51 with circular cross-section for receiving a respective second linear guide rail 39.

First linear guide rail 32 comprises a guiding axis 36 and can be fixed to the clipping machine 10 by means of a quick coupling device. It can be formed by a screw, which can be assembled to an end portion of first linear guide rail 32 on guiding axis 46. For this purpose main bore 50 includes an open end, for receiving first linear guide rail 32 and an opposed end closed by a sheet or a strap, wherein the sheet or strap includes at least one hole for receiving the threaded part of screw 46. The sheet or strap can be made of metal or a rigid material.

Replacement assembly group 20 further comprises displacement device 21 including an upper displacement element 22a and a lower displacement element 22b. Upper displacement element 22a and lower displacement element 22b define a hole to incorporate the tubular packing casing filled with flowable filling material. Upper displacement element and lower displacement element are movable along an axis perpendicular to feeding direction 18. Clipping device 25 and clip feeder 26 are arranged at a side face of replacement assembly group 20.

Figure 3:
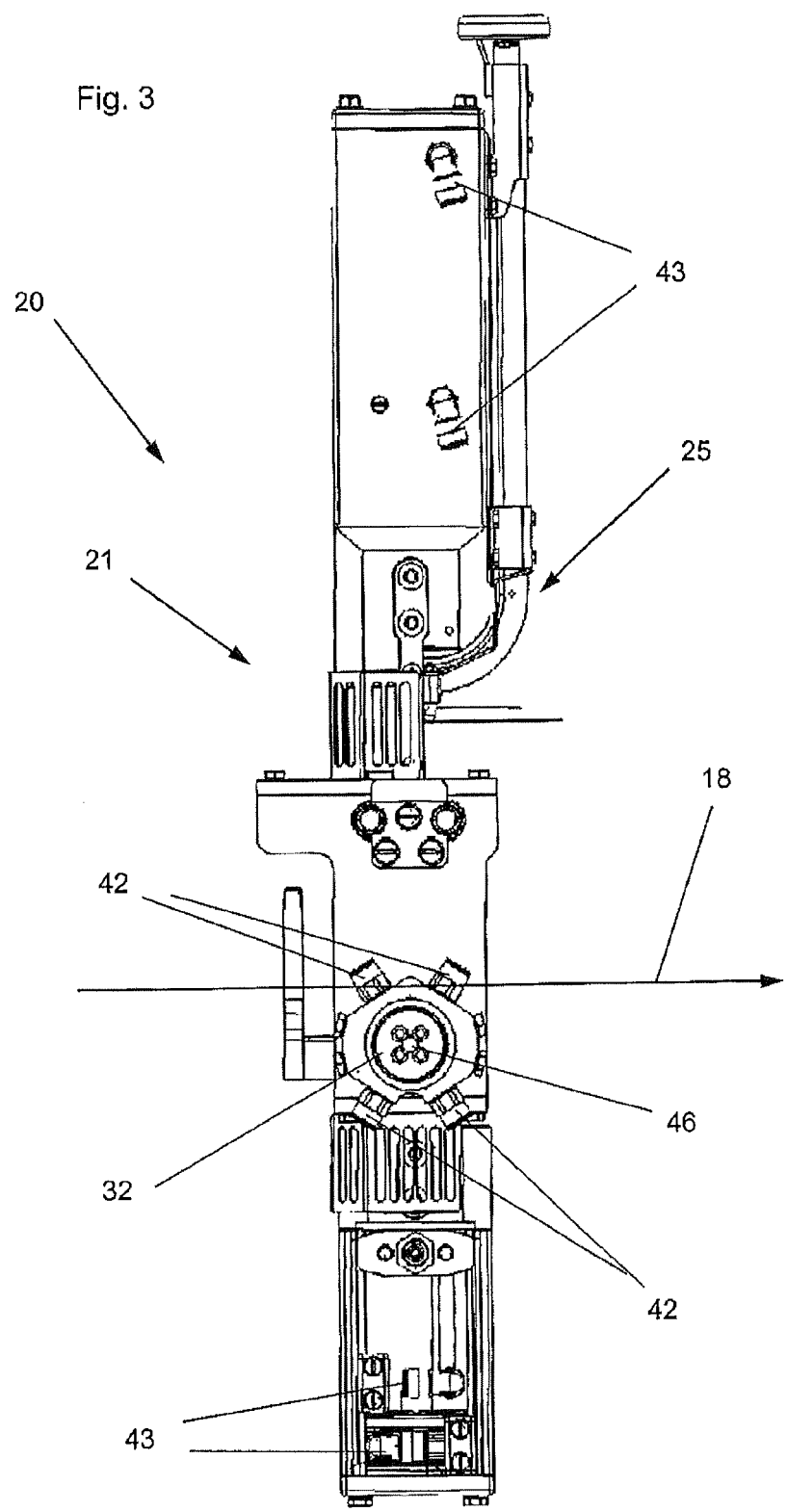
FIG. 3: is a front view of the replacement assembly group of FIG. 2.

The illustrated embodiment of the present invention in FIG. 3 shows a side view of the replacement assembly group 20 with a first linear guide rail 32 comprising four ducts 40 of which two upper first supply connectors 42 and two lower first supply connectors 42 are displayed. Upper first supply connectors 42 are configured to be connected with upper second supply connectors 43 and lower first supply connectors 42 are configured to be connected with lower second supply connectors 43 by a not displayed hose or pipe for providing and/or receiving the operation fluid.

Figure 4:
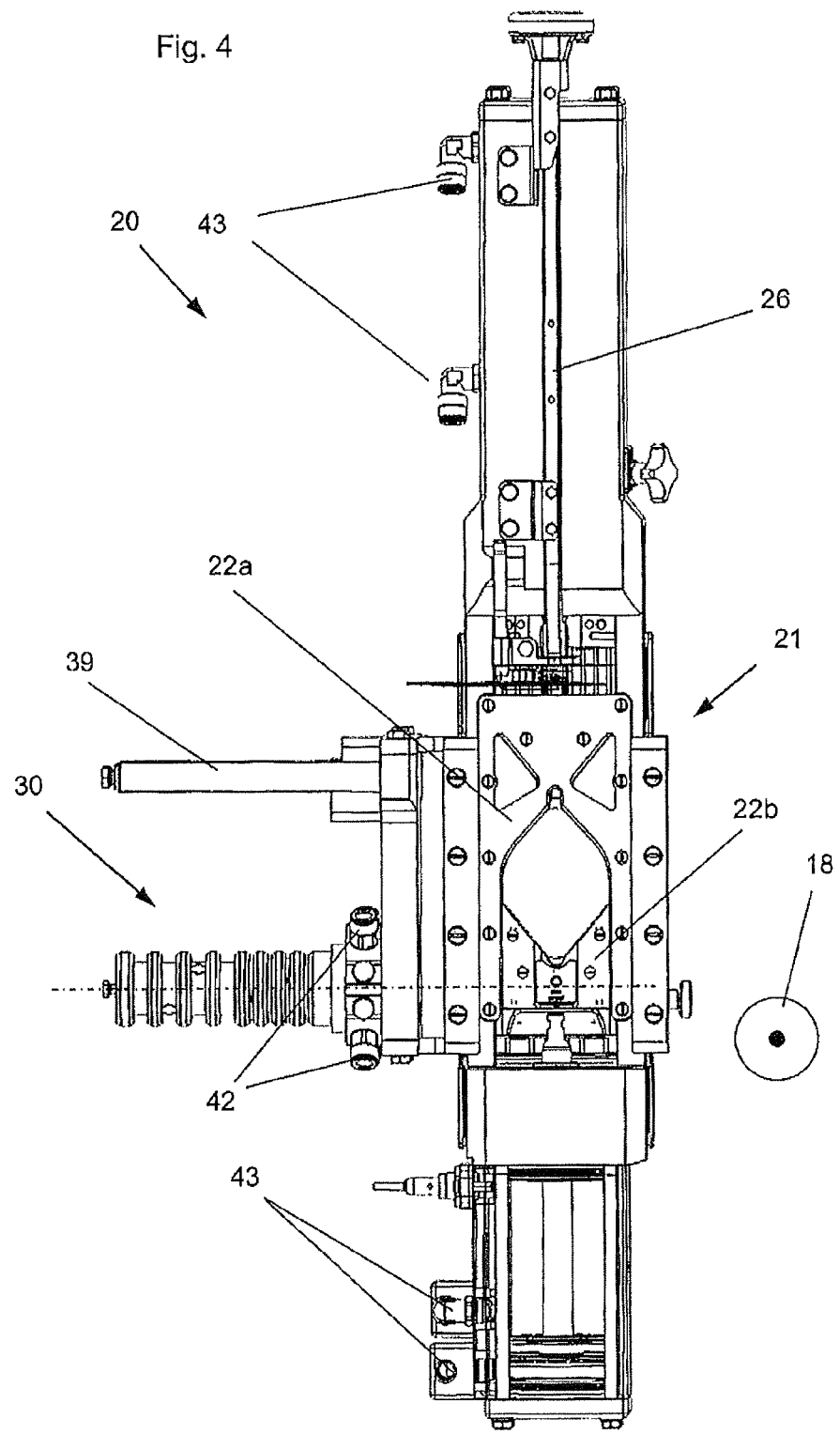
FIG. 4: is a side view of the replacement assembly group according to FIGS. 2 and 3.
Figure 5:
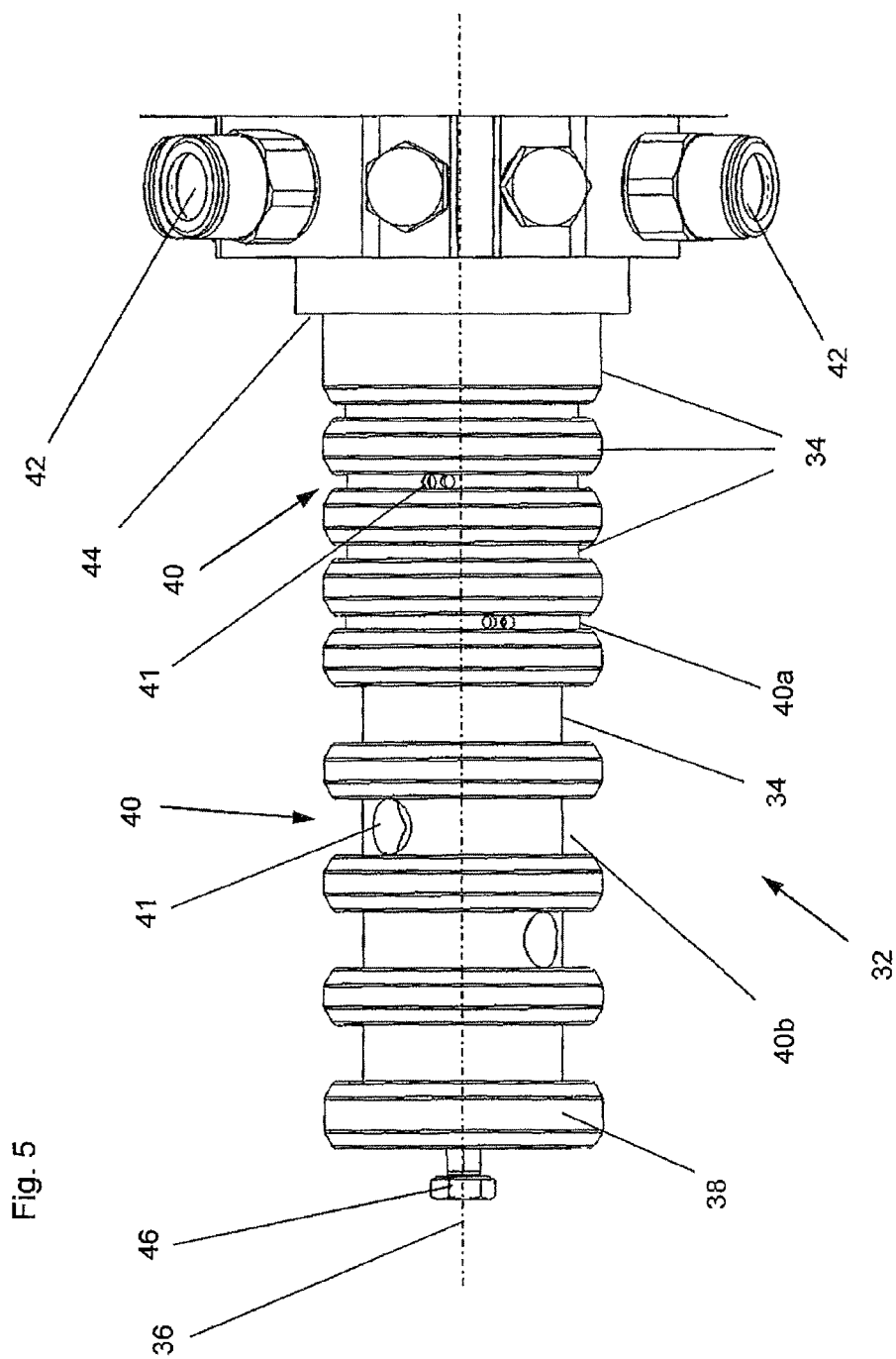
FIG. 5: is a side view of an embodiment of the first linear guide rail according to the present invention.

FIG. 4 shows a side view of replacement assembly group 20. In this perspective displacement device 21 with upper displacement element 22a and a lower displacement element 22b are clearly visible. Coupling device 30 is arranged perpendicular to feeding direction 18 and feeding direction 18 is perpendicular to plane of projection. An enlarged view of first linear guide rail 32 of FIG. 4 is displayed in FIG. 5.

First linear guide rail 32 comprises a cylindric body with a guiding axis 36. In other not shown embodiments, first linear guide rail 32 may comprise a tapered and/or cascaded body. A plurality of ring-shaped separators 38 are distributed spaced apart along guide rails axis 36, thus defining a plurality of annular segments 40b, free of material. However, first linear guide rail 32 is preferably an integral part with separators 38. Each annular segment 40b is part of a respective duct 40 which extends through aperture 41 and through the body of first linear guide rail 32 up to a respective first supply connector. Annular segments 40b and apertures 41 of ducts 40 may have different in sizes, depending on the respective demand on operation fluid to be routed through that respective duct 40.

Separators 38 may comprise chamfers in side regions for facilitating assembly of replacement assembly group 20 to clipping machine 10 and to prevent damage of not shown annular gaskets 54, provided inside main bore 50 of machine block 12. Furthermore, outer surface 34 of first linear guide rail 32 is preferably polished for allowing gaskets 54 to clog a respective duct 40 from an adjacent duct 40 or the surrounding environment. By these means a not shown duct connector 52 of main bore 50 can establish a clogged connection to a respective duct 40 without leakage of operation fluid from that particular connection. First linear guide rail 32 further comprises an abutment surface 44, which is contactable with a respective contact face 53 or recess of clipping machine 10 at engagement position E, when replacement assembly group 20 is coupled to clipping machine 10.

Figure 6:
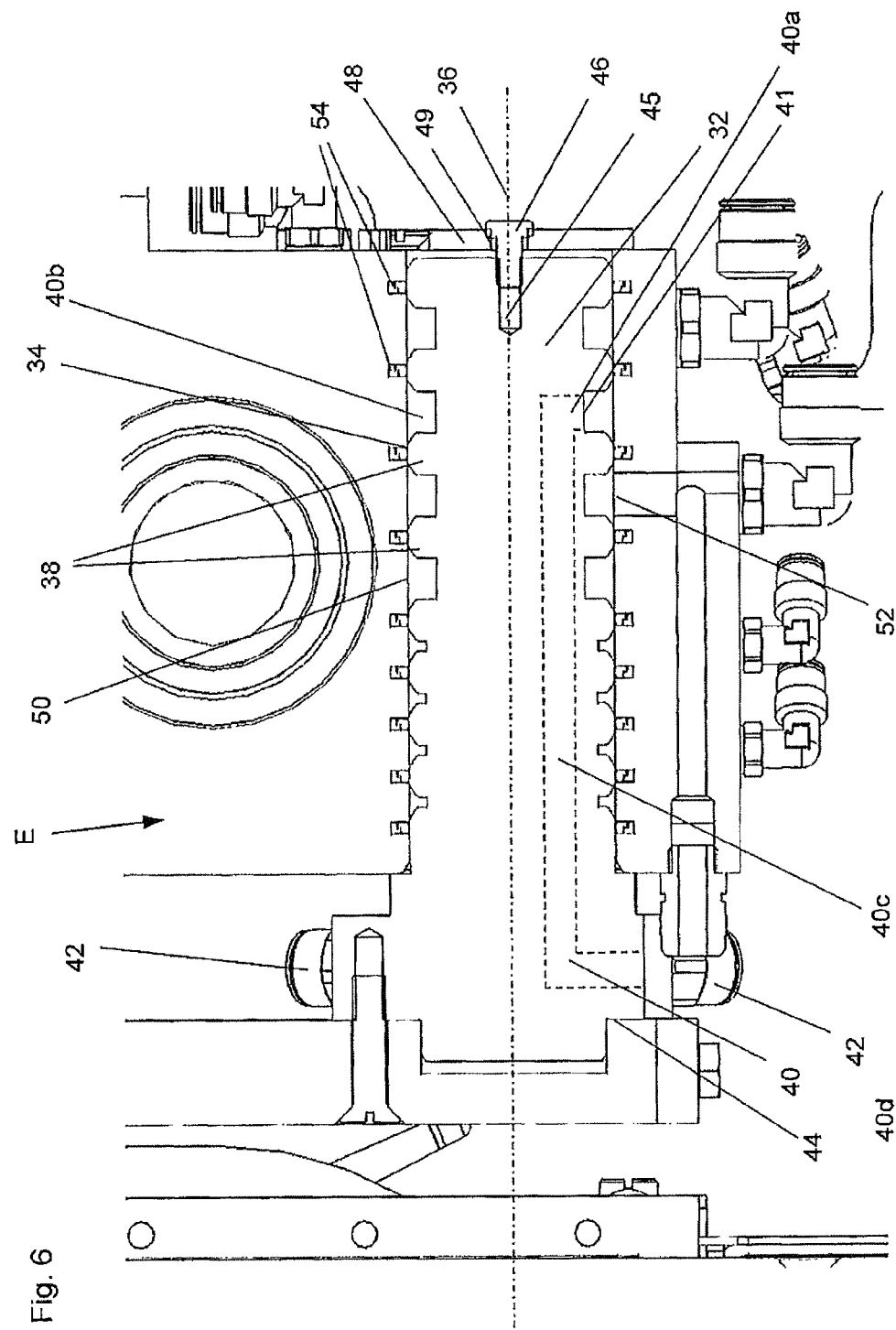
FIG. 6: is a sectional view of a machine block of the clipping machine with a main bore in which a first linear guide rail of the replacement assembly group is inserted in engagement position.

FIG. 6 shows first linear guide rail 32 inserted into main bore 50 of machine block 12 in engagement position E. Main bore 50 comprises a plurality of annular shaped gaskets 54 spaced along guiding axis 36 in a way that each gasket 54 engages an outer surface 34 of a respective separator 38 for clogging a sector between two separators 38 from the environment. A duct 40 inside first linear guide rail 32, comprising a first duct segment 40a with annular segment 40b, a second duct segment 40c and a third duct segment 40c, is displayed by dotted lines and extending from first supply connector 42 to annular segment 40b. A duct connector 52 is aligned with an adjacent annular segment 40b of a not shown duct 40.

As can be seen on the right hand side of FIG. 6, machine block 12 comprises a sheet 48, which is preferably made of metal, including a screw hole 49 and a socket for a head of screw 46. Screw 46 is inserted into screw hole 49 and screwed into blind hole 45 of first linear guide rail 32. By this means, screw 46 fixes first linear guide rail 32 of replacement assembly group 20 to metal sheet 48 of clipping machine 10.

In the displayed configuration, abutment surface 44 of first linear guide rail 32 is in contact with contact face 53 of machine block 12. Thus, replacement assembly group 20 is mounted completely to clipping machine 10. Furthermore, replacement assembly group 20 is fixed to clipping machine 10 and therefore, clipping machine 10 is prepared for producing sausage-shaped products.

The invention claimed is:

1. A clipping machine for producing sausage-shaped products by filling a flowable filling material into a tubular or bag-shaped packaging casing and closing said packaging casing by at least one closure means, the clipping machine comprises a filling tube, having a central axis and a filling outlet, for feeding said filling material in a feeding direction via said filling outlet into said packaging casing, a displacement device for gathering the filled packaging casing and for forming a plait-like portion thereto, at least substantially free from filling material and a clipping device for applying at least one closure means to said plait-like portion,
   where said displacement device is arranged in a replacement assembly group, wherein the replacement assembly group is removably arrangeable at the clipping machine in an engagement position, in which the replacement assembly group is coupled to the clipping machine for production process.

2. A clipping machine for producing sausage-shaped products by filling a flowable filling material into a tubular or bag-shaped packaging casing and closing said packaging casing by at least one closure means, the clipping machine comprises a filling tube, having a central axis and a filling outlet, for feeding said filling material in a feeding direction via said filling outlet into said packaging casing, a displacement device for gathering the filled packaging casing and for forming a plait-like portion thereto, at least substantially free from filling material and a clipping device for applying at least one closure means to said plait-like portion,
   where said displacement device is arranged in a replacement assembly group, wherein the replacement assembly group is removably arrangeable at the clipping machine in an engagement position, in which the replacement assembly group is coupled to the clipping machine for production process, and where the replacement assembly group comprises a coupling device with at least one first linear guide rail with an outer surface and a guiding axis, wherein the coupling device is connectable to the clipping machine in a way such that the first linear guide rail is at least partly inserted into a main bore of the clipping machine, wherein the replacement assembly group is linearly movable relatively to the clipping machine along the guiding axis.

3. The clipping machine according to claim 2, where the coupling device comprises at least one linear guide rail, which is arranged parallel to the first linear guide rail, for guiding the replacement assembly group linearly along the guiding axis.

4. The clipping machine according claim 3, where the guiding axis is arranged crosswise to the feeding direction.

5. The clipping machine according to claim 2, where the first linear guide rail has a circular cross-section.

6. The clipping machine according to claim 2, where the first linear guide rail comprises at least one duct extending inside the first linear guide rail, wherein an operation fluid is routable through the duct between the clipping machine and the displacement device.

7. The clipping machine according to claim 6, where the duct comprises a segment that extends longitudinally inside and along the first linear guide rail and a segment that extends radially from the outer surface towards the inside of the first linear guide rail, wherein the duct has an aperture and a first supply connector at the outer surface of the first linear guide rail.

8. The clipping machine according to claim 7, where the clipping machine comprises at least one duct connector, wherein the duct connector is configured to provide an operation fluid to a respective duct and/or to receive an operation fluid from a respective duct, wherein the duct connector is arranged to be connected to a respective duct when the replacement assembly group is coupled to the clipping machine in the engagement position.

9. The clipping machine according to claim 8, where the duct connector comprises at least one gasket for clogging the connection between the duct and the respective duct connector from the environment.

10. The clipping machine according to claim 9, where at least one gasket is circumferentially arranged inside the main bore and/or at least one gasket is circumferentially arranged at the outer surface of the first linear guide rail.

11. The clipping machine according to claim 7, where the first linear guide rail comprises a plurality of ducts through which an operation fluid is routable between the clipping machine and the displacement device.

12. The clipping machine according to claim 11, where the ducts have different dimensions.

13. The clipping machine according to claim 7, where the replacement assembly group is releasably retainable at the clipping machine by means of a screw.

14. The clipping machine according to claim 6, where the duct comprises an annular segment that extends circumferentially around the guiding axis, wherein the annular segment is circumferentially apertured at its outer surface.

15. A clipping machine for producing sausage-shaped products by filling a flowable filling material into a tubular or bag-shaped packaging casing and closing said packaging casing by at least one closure means, the clipping machine comprises a filling tube, having a central axis and a filling outlet, for feeding said filling material in a feeding direction via said filling outlet into said packaging casing, a displacement device for gathering the filled packaging casing and for forming a plait-like portion thereto, at least substantially free from filling material and a clipping device for applying at least one closure means to said plait-like portion, where said displacement device is arranged in a replacement assembly group, wherein the replacement assembly group is removably arrangeable at the clipping machine in an engagement position, in which the replacement assembly group is coupled to the clipping machine for production process, and where the replacement assembly group comprises a coupling device via which the replacement assembly group is connectable to the clipping machine.

* * * * *